(12) United States Patent
Candir et al.

(10) Patent No.: US 12,722,510 B2
(45) Date of Patent: Sep. 1, 2026

(54) VEHICLE HAVING AN ELECTRICAL CIRCUIT ARRANGEMENT AND TWO ELECTRIC DRIVE UNITS AND METHOD FOR THE OPERATION THEREOF

(71) Applicant: MERCEDES-BENZ GROUP AG, Stuttgart (DE)

(72) Inventors: Akin Candir, Filderstadt (DE); Urs Boehme, Ehningen (DE); Markus Orner, Rennigen (DE); Nathan Troester, Stuttgart (DE); Jörg Weigold, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 87 days.

(21) Appl. No.: 18/996,158

(22) PCT Filed: Jul. 13, 2023

(86) PCT No.: PCT/EP2023/069592
§ 371 (c)(1),
(2) Date: Jan. 17, 2025

(87) PCT Pub. No.: WO2024/017775
PCT Pub. Date: Jan. 25, 2024

(65) Prior Publication Data

US 2026/0175721 A1 Jun. 25, 2026

(30) Foreign Application Priority Data

Jul. 18, 2022 (DE) ..................... 10 2022 002 607.4

(51) Int. Cl.
*B60L 53/24* (2019.01)
*B60L 53/10* (2019.01)
(Continued)

(52) U.S. Cl.
CPC ............... *B60L 53/24* (2019.02); *B60L 53/11* (2019.02); *B60L 55/00* (2019.02); *B60L 2210/40* (2013.01); *B60L 2220/42* (2013.01); *H02M 1/007* (2021.05)

(58) Field of Classification Search
CPC ...... B60L 53/11; B60L 53/24; B60L 2220/42; H02M 1/008
See application file for complete search history.

(56) References Cited

U.S. PATENT DOCUMENTS

2016/0243953 A1* 8/2016 Spesser ................... B60L 53/14
2020/0106287 A1* 4/2020 Niimi ..................... B60L 50/51
(Continued)

FOREIGN PATENT DOCUMENTS

DE 102009052680 A1 5/2011
DE 102016015311 A1 7/2017
(Continued)

OTHER PUBLICATIONS

International Search Report and Written Opinion mailed Oct. 2, 2023 in related/corresponding International Application No. PCT/EP2023/069592.
(Continued)

*Primary Examiner* — Rexford N Barnie
*Assistant Examiner* — David A Shiao
(74) *Attorney, Agent, or Firm* — PATENT PORTFOLIO BUILDERS PLLC

(57) ABSTRACT

An electrical circuit arrangement includes a traction battery, electrical connection for electrically coupling to a vehicle-external electric unit, and first and second high-voltage potentials. The circuit arrangement has two electric drive units each having an inverter and an electric three-phase motor electrically coupled thereto for driving the vehicle. The circuit arrangement is configured such that the two
(Continued)

Figure 1:
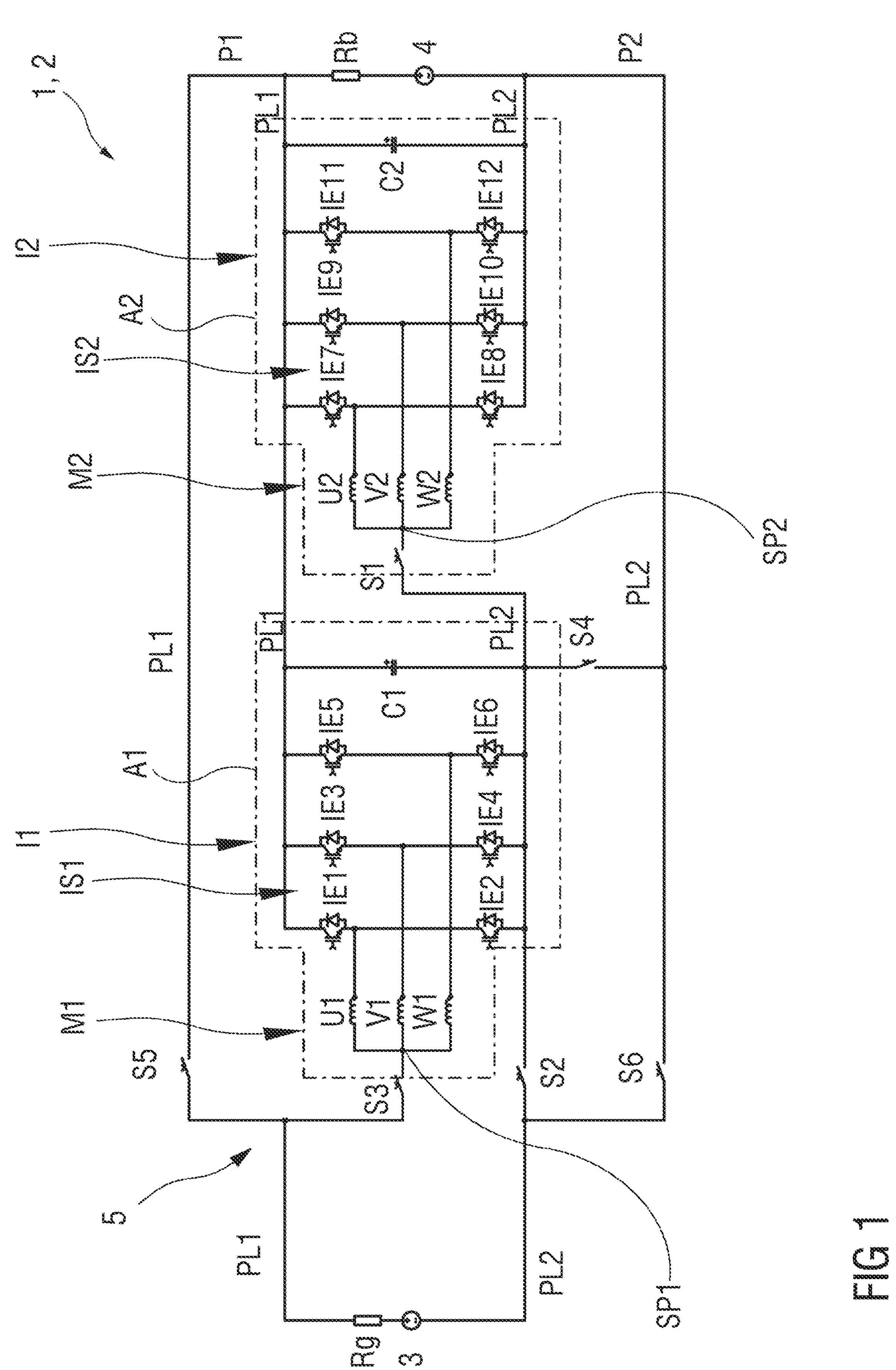

electric drive units can be electrically connected in series between the electrical connection and the traction battery such that the first electric drive unit increases the first high-voltage potential and the second electric drive unit increases the second high-voltage potential from the electrical connection to the traction battery. The inverters each have a capacitor between a potential line of the first high-voltage potential and a potential line of the second high-voltage potential. The second electric drive unit can be electrically connected in series with the capacitor connection of the first electric drive unit.

5 Claims, 13 Drawing Sheets

(51) Int. Cl.
*B60L 55/00* (2019.01)
*H02M 1/00* (2006.01)

(56) References Cited

U.S. PATENT DOCUMENTS

| | | | | |
|---|---|---|---|---|
| 2020/0298722 | A1* | 9/2020 | Smolenaers | B60L 53/24 |
| 2022/0289053 | A1* | 9/2022 | Lian | B60L 53/11 |
| 2023/0150375 | A1* | 5/2023 | Watanabe | B60L 50/51<br>318/139 |
| 2023/0249566 | A1* | 8/2023 | Kim | B60L 50/60<br>320/109 |
| 2023/0378797 | A1* | 11/2023 | Hao | B60R 16/033 |

FOREIGN PATENT DOCUMENTS

| | | | |
|---|---|---|---|
| DE | 102017009352 | A1 | 4/2018 |
| DE | 102018000465 | A1 | 7/2018 |
| DE | 102018000488 | A1 | 7/2018 |
| DE | 102018000580 | A1 | 7/2018 |
| DE | 102018009840 | A1 | 6/2019 |
| DE | 102018009848 | A1 | 6/2019 |
| DE | 102019005621 | A1 | 4/2020 |
| DE | 102019209786 | A1 | 1/2021 |
| DE | 102021003851 | A1 | 9/2021 |

OTHER PUBLICATIONS

Office Action created Oct. 11, 2022 in related/corresponding DE Application No. 10 2022 002 607.4.

Weccard et al.; "ECE R 100: Hochvoltvorschriften bei Elektrofahrzeugen;" Oct. 7, 2020; https://wiki.ei.htwg-konstanz.de/_media/professoren_webseiten/rebholz/uebersicht_ece_r_100.pdf.

* cited by examiner 1, 2
P1
Rb
4
P2
PL1
PL2
C2
IE11
IE12
A2, I2, IS2
IE9
IE10
IE7
IE8
U2
V2
W2
AB2
SP2
S1
C1
S4
IE5
IE6
A1, I1, IS1
IE3
IE4
IE1
IE2
U1
V1
W1
S5
S3
S2
S6
5
SP1
AB1
Rg
3

1, 2
P1
Rb
4
P2
PL1
PL2
C2
IE11
IE12
A2, I2, IS2
IE9
IE10
IE7
IE8
FL2
U2
V2
W2
S1
PL1
S4
PL2
C1
IE5
IE6
A1, I1, IS1
IE3
IE4
PL2
IE1
IE2
PL1
S3
U1
V1
W1
S5
S2
S6
5
FL1
PL1
Rg
PL2
3

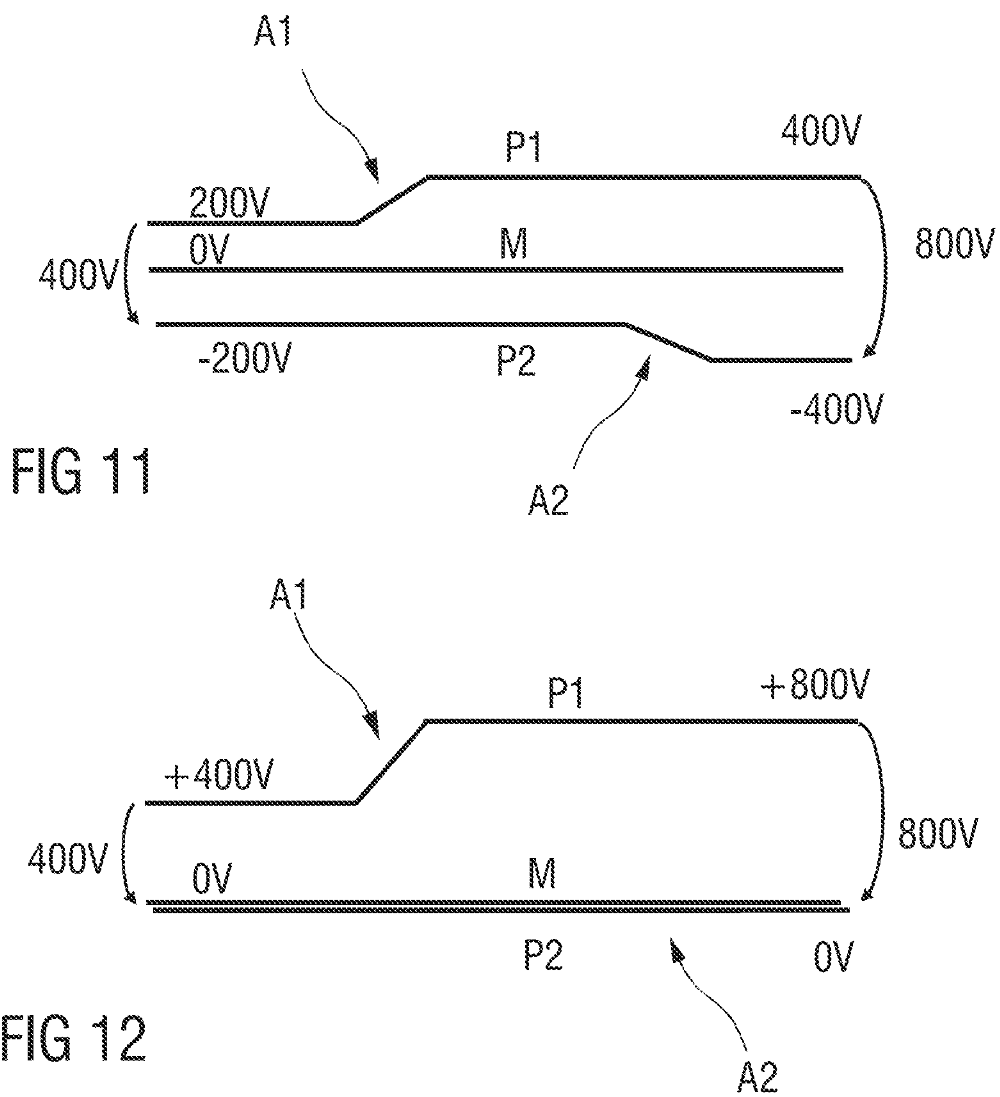
FIG 11
FIG 12
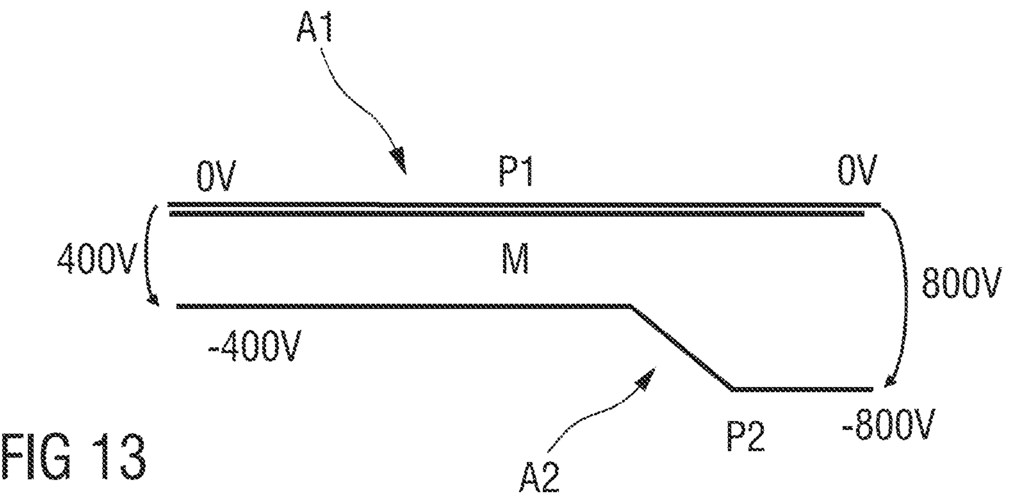
FIG 13

VEHICLE HAVING AN ELECTRICAL CIRCUIT ARRANGEMENT AND TWO ELECTRIC DRIVE UNITS AND METHOD FOR THE OPERATION THEREOF

BACKGROUND AND SUMMARY OF THE INVENTION

Exemplary embodiments of the invention relate to a vehicle and a method for the operation thereof.

The generic document DE 10 2018 000 465 A1 describes an electric drive system for a vehicle, comprising a battery with two different electrochemical sub-regions and two inverters, each of which can be or is electrically coupled to a sub-region of the battery. For this purpose, the electric drive system comprises two electric three-phase motors, which can each be electrically coupled or are each electrically coupled to one of the inverters, wherein neutral points of the electric three-phase motors can each be electrically coupled or are electrically coupled to a charging contact of a direct current charging connection of the electric drive system.

A system for charging an electrical energy storage device by means of an electric drive system is known from DE 10 2019 209 786 A1. Inductive coupling between phase windings or phase strings of an electric motor is provided for galvanic isolation between a voltage source and the energy storage device to be charged. For this purpose, the phase windings of the electric motor can be divided into two groups, wherein each group has a separate neutral point. A separate bridge circuit consisting of capacitors, diodes or semiconductor switches is provided for each neutral point.

Document DE 10 2021 003 851 A1 also relates to an electric drive system for a vehicle, having an electric three-phase motor, an electrical energy storage device, an inverter of the electric three-phase motor, and a charging connection to couple the electric energy storage device to a charging unit. A switching device has a first switching state in which the charging connection is galvanically connected to the electrical energy storage device and the inverter is galvanically isolated from the charging connection and from the electrical energy storage device. In a second switching state of the switching device, the charging connection is galvanically connected to the inverter and to the electrical energy storage device, and in a third switching state of the switching device the inverter is galvanically connected to the electrical energy storage device and the charging connection is galvanically isolated from the electrical energy storage device and from the inverter.

Furthermore, an energy coupler for electrically coupling electrical on-board power supply systems and a method for electrically coupling electrical on-board power supply systems is known from prior art, as described in DE 10 2017 009 352 A1. The energy coupler for electrically coupling a first electrical on-board power supply system to which a first DC electrical voltage is applied to an electrical on-board power supply system to which a second DC electrical voltage is applied has a first and a second clocked energy converter, each of which has an on-board power supply system connection and an intermediate circuit connection. The on-board power supply system connection of the first clocked energy converter is connected to the first on-board power supply system and the on-board power supply system connection of the second clocked energy converter is connected to the second on-board power supply system. The intermediate circuit connections of the first and second clocked energy converters are connected to a common DC voltage intermediate circuit. A first electrical potential of the DC voltage intermediate circuit is electrically connected to one of the electrical potentials of the first on-board power supply system by means of the first clocked energy converter. A second electrical potential of the DC voltage intermediate circuit is electrically connected to one of the electrical potentials of the second on-board power supply system by means of the second clocked energy converter.

A circuit arrangement for a hybrid or electric vehicle is described in DE 10 2018 009 840 A1. The circuit arrangement comprises a high-voltage battery for storing electrical energy, at least one electric motor for driving the hybrid or electric vehicle, a converter, by means of which high voltage DC voltage which can be provided by the high-voltage battery is converted into high-voltage AC voltage for operating the electric motor, and a charging connection for providing electrical energy for charging the high-voltage battery. The converter is formed as a three-phase converter.

A circuit arrangement for a hybrid or electric vehicle is known from DE 10 2018 009 848 A1. The circuit arrangement comprises a high-voltage battery for storing electrical energy, at least one electric motor for driving the hybrid or electric vehicle, a converter by means of which high-voltage DC voltage, which can be provided by the high-voltage battery, can be converted into high-voltage alternating voltage for operating the electric motor, and a charging connection for providing electrical energy for charging the high-voltage battery. The converter is a three-phase converter having at least one switch unit assigned to one phase of the electric motor, which comprises two series-connected switch groups, each of which has two series-connected IGBTs, wherein a connection is arranged between the IGBTs of one of the switch groups, which is electrically connected directly to a line of the charging connection.

An on-board power supply system for an electrically drivable motor vehicle is described in DE 10 2019 005 621 A1. The on-board power supply system comprises a vehicle battery, a multi-phase electric motor, and an inverter electrically coupled to the vehicle battery, which comprises a respective series circuit of respective series-connected switching units for each of the phases of the electric motor. The switching units of a respective one of the series circuits provide a respective central connection to which a respective phase winding of the electric motor is connected. The inverter is formed as a three-level inverter, in which each of the switching units has a series connection of two switching elements connected to each other at a connection point. In the two switching units of at least one of the series circuits, an inductor with a respective first connection is connected to the respective connection points. The respective second connections of the inductors can be electrically coupled to a DC charging connection of the motor vehicle.

An electric drive system for a vehicle and a method for its operation are described in DE 10 2018 000 488 A1. The electric drive system comprises at least one electric three-phase motor and a battery for supplying electrical power to the electric three-phase motor. The electric three-phase motor can be or is electrically coupled to the battery via an inverter. A neutral point of the electric three-phase motor can be or is electrically coupled to a positive pole connection of a DC charging connection of the electric drive system and a negative pole of the battery can be or is electrically coupled to a negative pole connection of the DC charging connection of the electric drive system.

A charging device for charging a battery of a motor vehicle having a buck converter is described in DE 10 2009 052 680 A1. The charging device comprises an electric motor for driving the motor vehicle and a drive converter that converts the DC voltage of the battery for the electric motor when the motor vehicle is in drive operation. Together with the drive converter, the electric motor serves as a boost converter for charging the battery. A buck converter is connected upstream of the boost converter in order to reduce a DC input voltage to such an extent that it represents a suitable charging voltage for the battery after being boosted by the boost converter.

An electrical on-board power supply system having an inverter and a DC converter, which has an energy storage element in a negative path, is known from DE 10 2018 000 580 A1. The electrical on-board power supply system for a partially or completely electrically operable motor vehicle comprises an electrical inverter, by means of which an AC voltage can be generated from a DC voltage for a first operating state of the motor vehicle and a DC voltage can be generated from an AC voltage for a second operating state of the motor vehicle, and at least one galvanically coupled DC converter, which is connected to the electrical inverter on a DC voltage side of the electrical inverter. The at least one DC converter has an energy storage element to be clocked, which is interconnected in a negative path of the at least one DC converter.

Exemplary embodiments of the invention are directed to a vehicle which is improved relative to the prior art, and a method for its operation which is improved relative to the prior art.

A vehicle has an electrical circuit arrangement. This circuit arrangement comprises a traction battery, an electrical connection for electrical coupling to a vehicle-external electric unit, a first high-voltage potential, a second high-voltage potential, wherein the first high-voltage potential is a positive high-voltage potential and the second high-voltage potential is a negative high-voltage potential or vice versa. The term “high-voltage”, also abbreviated to HV, is to be understood in particular as an electrical DC voltage which is in particular greater than approximately 60V. In particular, the term “high-voltage” is to be interpreted in accordance with the ECE R 100 standard.

In accordance with the invention, the circuit arrangement comprises two electric drive units, each with an inverter and an electric three-phase motor electrically coupled thereto for driving the vehicle. The traction battery is provided, in particular, for the electrical power supply of these drive units for driving the vehicle.

In accordance with the invention, the electrical circuit arrangement is designed such that the two electric drive units can be electrically connected in series between the electrical connection and the traction battery such that the first electric drive unit increases the first high-voltage potential and the second electric drive unit increases the second high-voltage potential from the electrical connection to the traction battery. In the opposite direction, i.e., from the traction battery to the electrical connection, the first electric drive unit correspondingly reduces the first high-voltage potential and the second electric drive unit reduces the second high-voltage potential. The solution according to the invention thus provides a DC converter between the electrical connection and the traction battery, which is formed by the two electric drive units, i.e., by their described interconnection, and which operates in the manner described. The terms increase and decrease each refer to an absolute value of a respective potential voltage in relation to a reference potential, in particular ground potential, i.e., without taking the sign into account.

The solution according to the invention thus makes it possible to use the electric drive units already present in the vehicle as DC converters and thus to provide them an additional purpose. In particular, this enables the traction battery to be charged by an electric unit formed external to the vehicle that is electrically coupled to the electrical connection as a DC charging station, the charging voltage of which is lower than a nominal voltage of the traction battery. Furthermore, an opposite energy supply is also possible, also referred to as buck operation. Electrical energy is supplied by the traction battery to a vehicle-external electric unit that is electrically coupled to the electrical connection, for example to feed electrical energy from the traction battery, in particular via a DC charging station electrically coupled to the electrical connection, into a public energy supply network or into an energy supply network of a building. This energy supply in both directions is also referred to as bidirectional charging. With the solution according to the invention, no additional DC converter needs to be provided in the vehicle for this purpose, which results in corresponding savings in installation space, weight and costs. Other solutions to enable charging of the traction battery with a lower charging voltage, for example a configuration of the traction battery as a switchover battery to enable charging by a modified circuit of battery modules of the traction battery, are also not required by the solution according to the invention.

In a method according to the invention for operating the vehicle, it is correspondingly provided that, for charging the traction battery by a vehicle-external electric unit, which is electrically coupled to the electrical connection and is designed as a DC charging station and whose charging voltage is lower than the nominal voltage of the traction battery, and/or for the provision of electrical energy by the traction battery to a vehicle-external electric unit, which is electrically coupled to the electrical connection, the two electric drive units are electrically connected in series between the electrical connection and the traction battery.

The solution according to the invention makes it possible, for example, to charge an 800V traction battery at a DC charging station with a charging voltage of 400V or 500V, for example.

The solution according to the invention also makes it possible to fulfil safety requirements with regard to an overload of an insulation in the DC charging station, an unrestricted function of an insulation monitor, and a shutdown of a short circuit in the traction battery caused by an insulation fault in the vehicle.

In accordance with the invention, the inverters each have a capacitor between a potential line of the first high-voltage potential and a potential line of the second high-voltage potential. The circuit arrangement is designed in such a way that the second electric drive unit can be electrically connected in series with the capacitor connection of the first electric drive unit.

In one possible embodiment, it is provided that one of the potential lines of the inverter of the second electric drive unit is electrically connected to a capacitor connection contact of the capacitor connection of the inverter of the first electric drive unit, which has the same high-voltage potential. In order to enable the electrical series connection of the two drive units described above, it is then provided, for example, that the circuit arrangement is designed in such a way that a neutral point of the electric three-phase motor of the second electric drive unit can be electrically connected to the other capacitor connection contact of the capacitor connection of the inverter of the first electric drive unit, the potential line of this inverter, which is electrically connected to this capacitor connection contact, can be electrically connected to a connection contact of the electrical connection having the same high-voltage potential, and a neutral point of the electric three-phase motor of the first electric drive unit can be electrically connected to the other connection contact of the electrical connection. Alternatively, in order to enable the electrical series connection of the two drive units described above, it is provided, for example, that the circuit arrangement is designed in such a way that a winding connection of the electric three-phase motor of the second electric drive unit can be electrically connected to the other capacitor connection contact of the capacitor connection of the inverter of the first electric drive unit, the potential line of this inverter, which is electrically connected to this capacitor connection contact, can be electrically connected to a connection contact of the electrical connection having the same high-voltage potential, and a winding connection of the electric three-phase motor of the first electric drive unit can be electrically connected to the other connection contact of the electrical connection.

In particular, it is provided that the traction battery is electrically connected to the capacitor connection of the second electric drive unit. In particular in order to continue to enable the basic function of the electric drive units, i.e., the drive of the vehicle, it is also advantageously provided that the circuit arrangement is designed in such a way that the traction battery can be electrically connected to the capacitor connection of the first electric drive unit. As a result, the two electric drive units can be supplied with electrical energy by the traction battery. In the method for operating the vehicle, it is therefore provided that both inverters are each connected directly to the traction battery for driving operation of the vehicle.

In a possible embodiment of the vehicle, it is provided that the circuit arrangement is designed such that the electrical connection can be electrically connected directly to the traction battery. This also enables the traction battery to be charged by a vehicle-external electric unit that is electrically coupled to the electrical connection and designed as a DC charging station, the charging voltage of which is at least as high as the nominal voltage of the traction battery. In the method for operating the vehicle, it is correspondingly provided that the electrical connection is electrically connected directly to the traction battery for charging the traction battery by a vehicle-external electric unit which is electrically coupled to the electrical connection and is designed as a DC charging station, the charging voltage of which is at least as high as the nominal voltage of the traction battery.

Exemplary embodiments of the invention are explained in more detail below with reference to the drawings.

BRIEF DESCRIPTION OF THE DRAWING FIGURES

Figure 2:
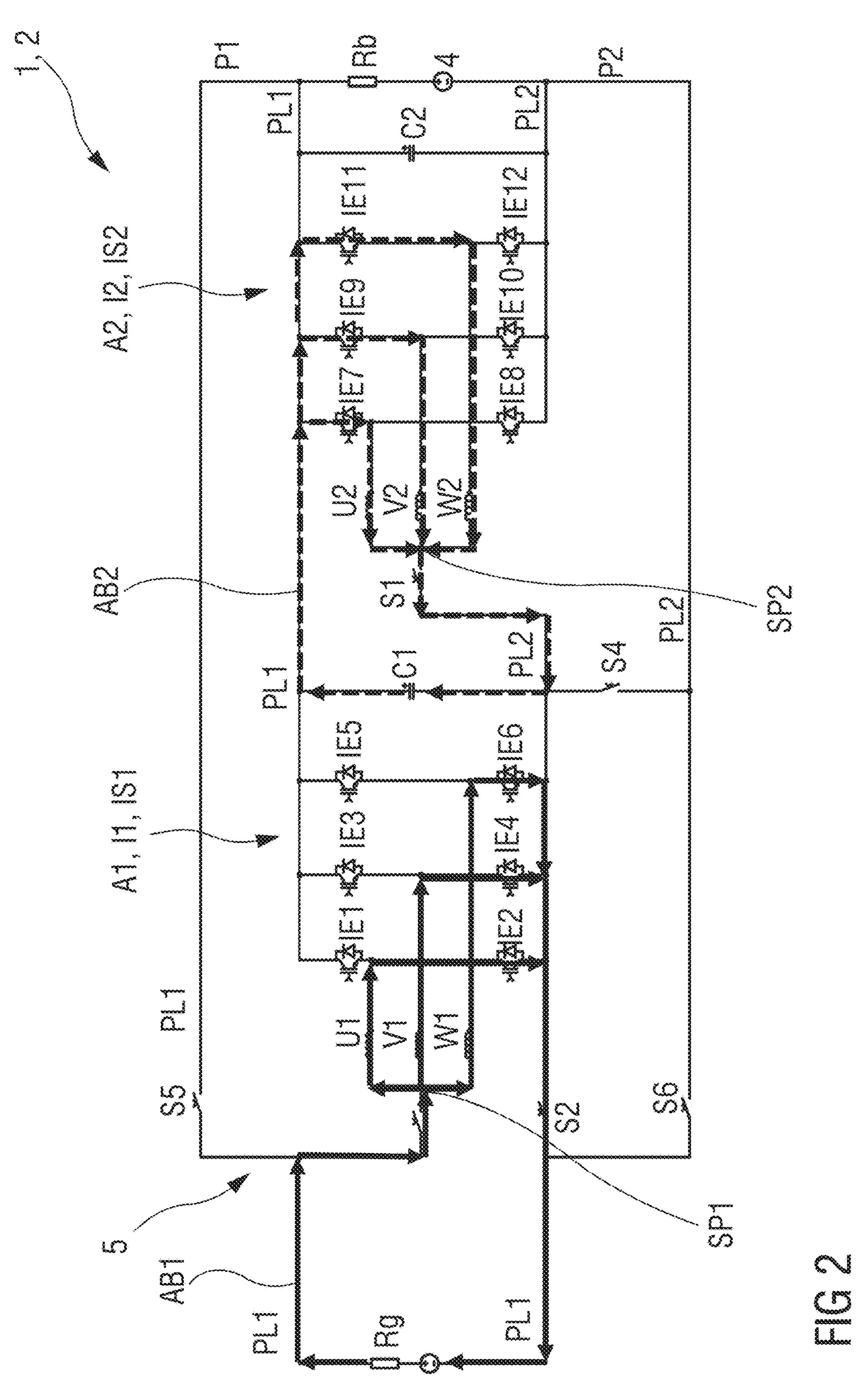
Figure 3:
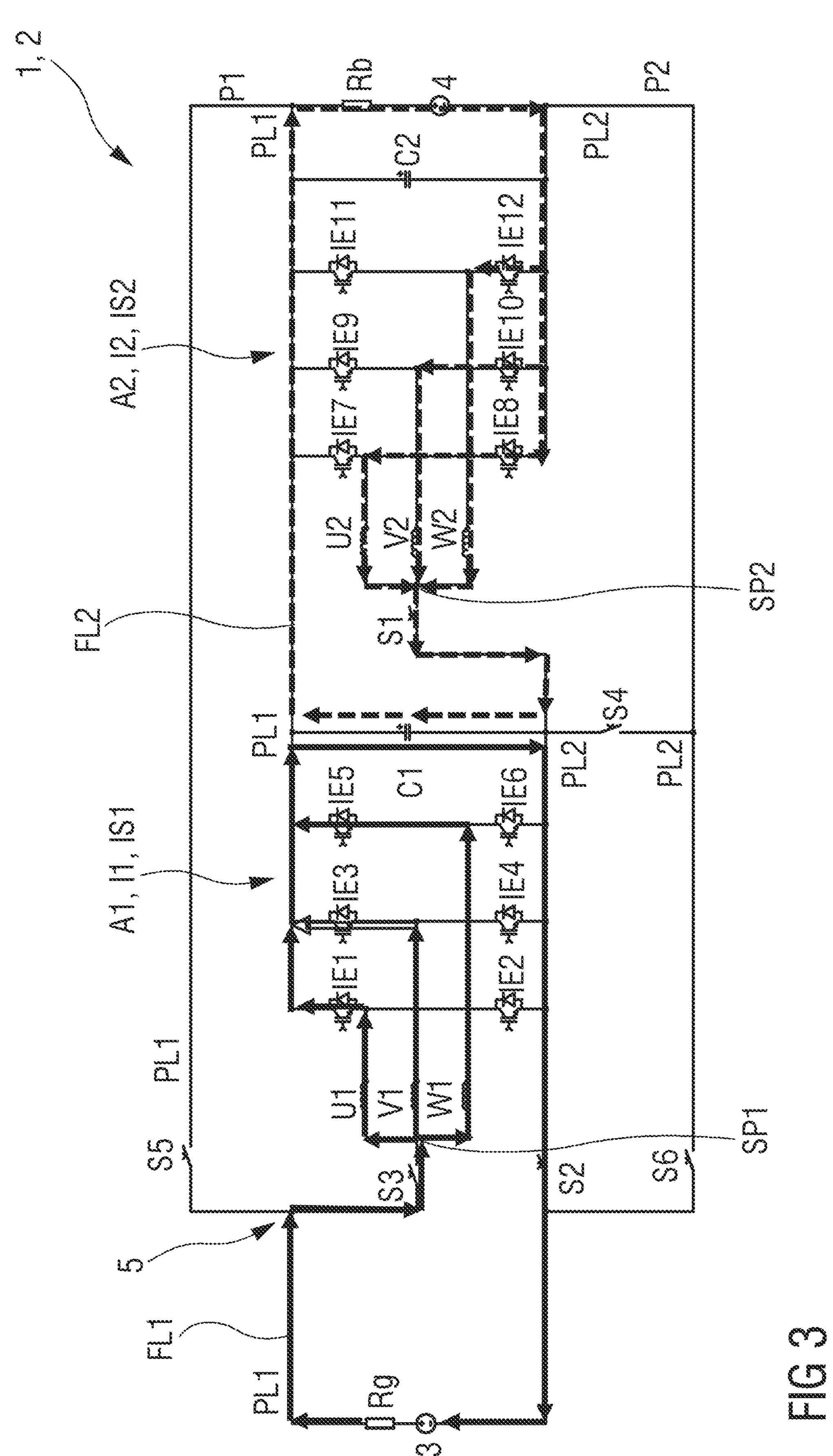
Figure 4:
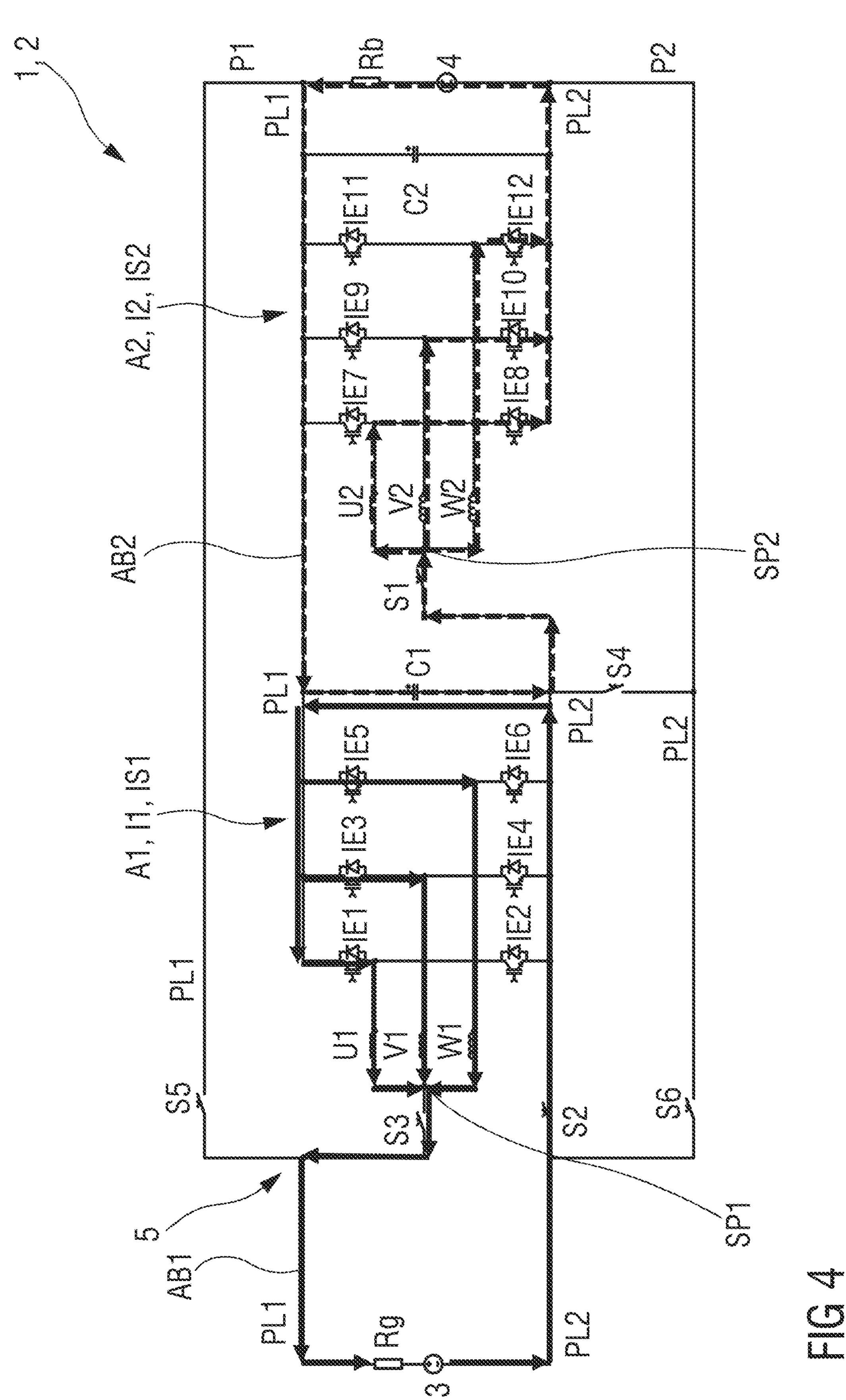
Figure 5:
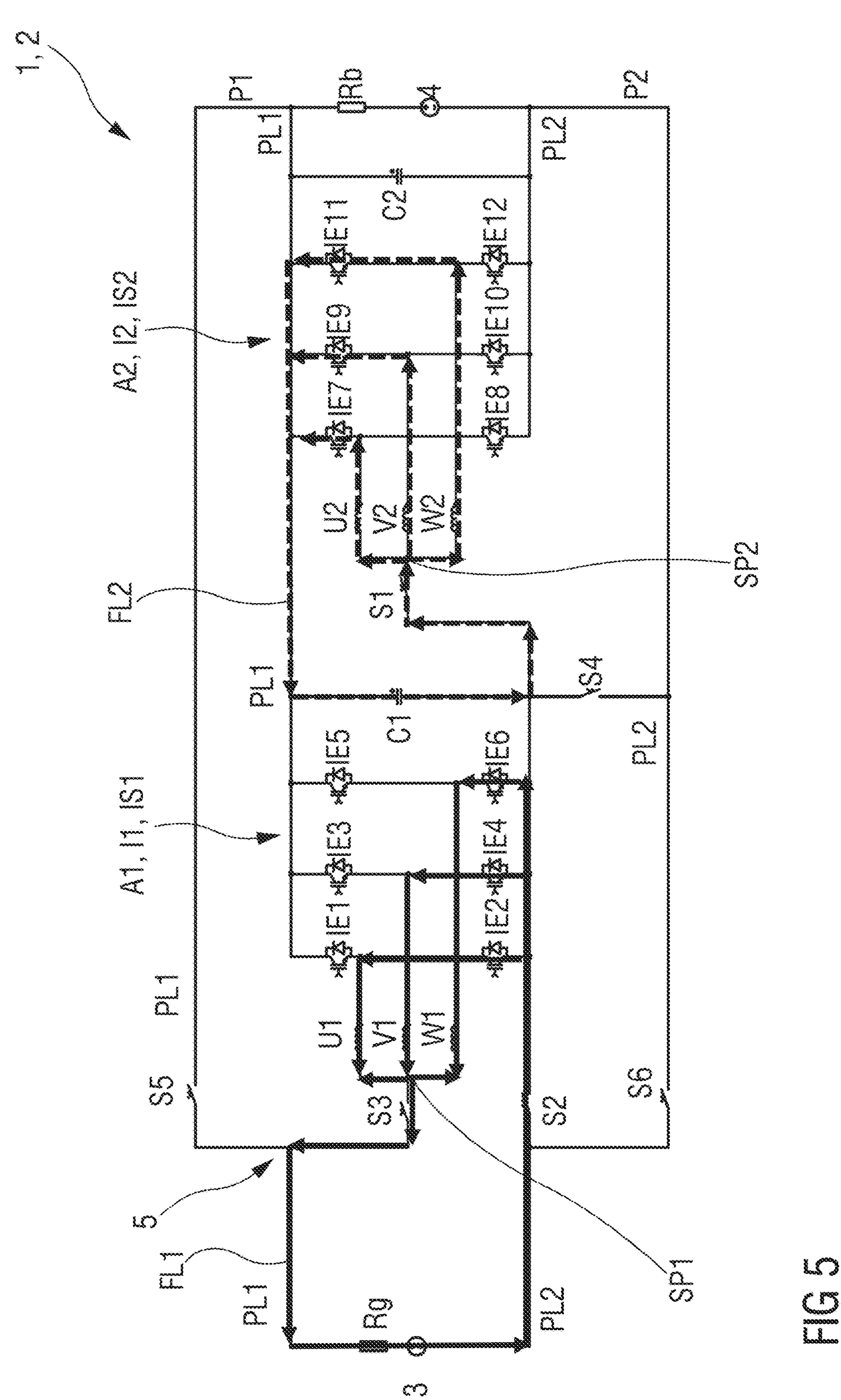
Figure 6:
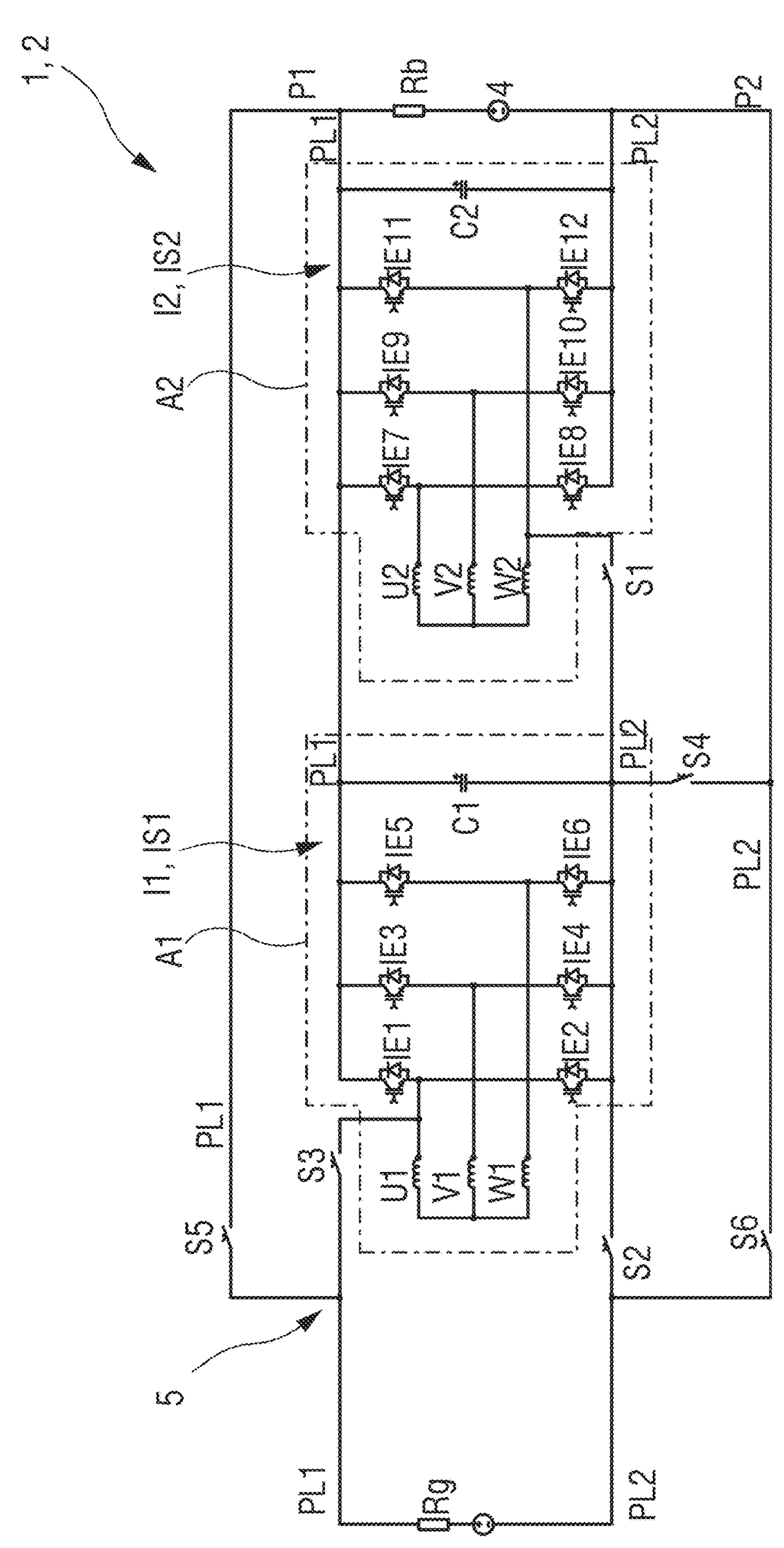
Figure 7:
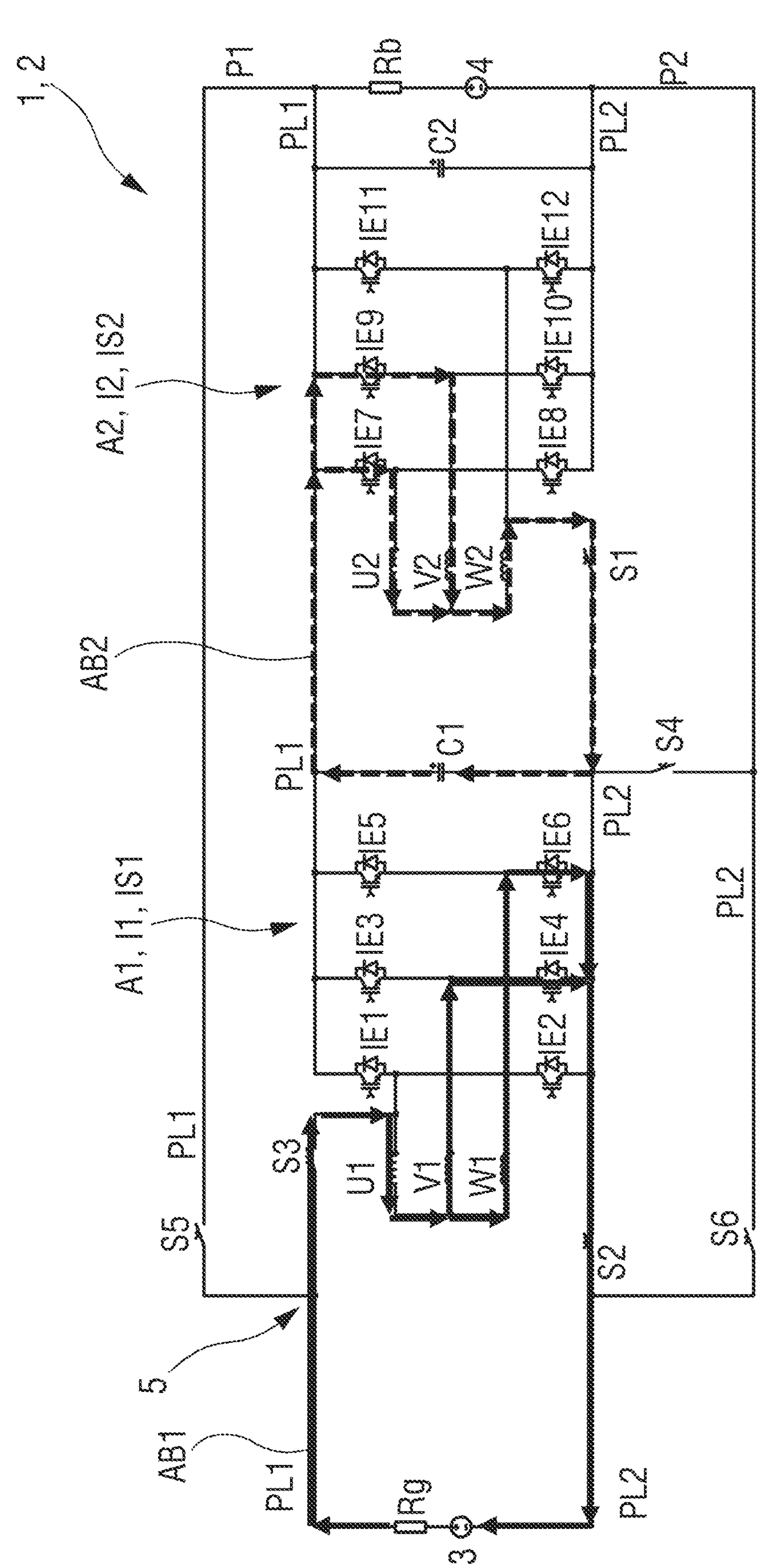
Figure 8:
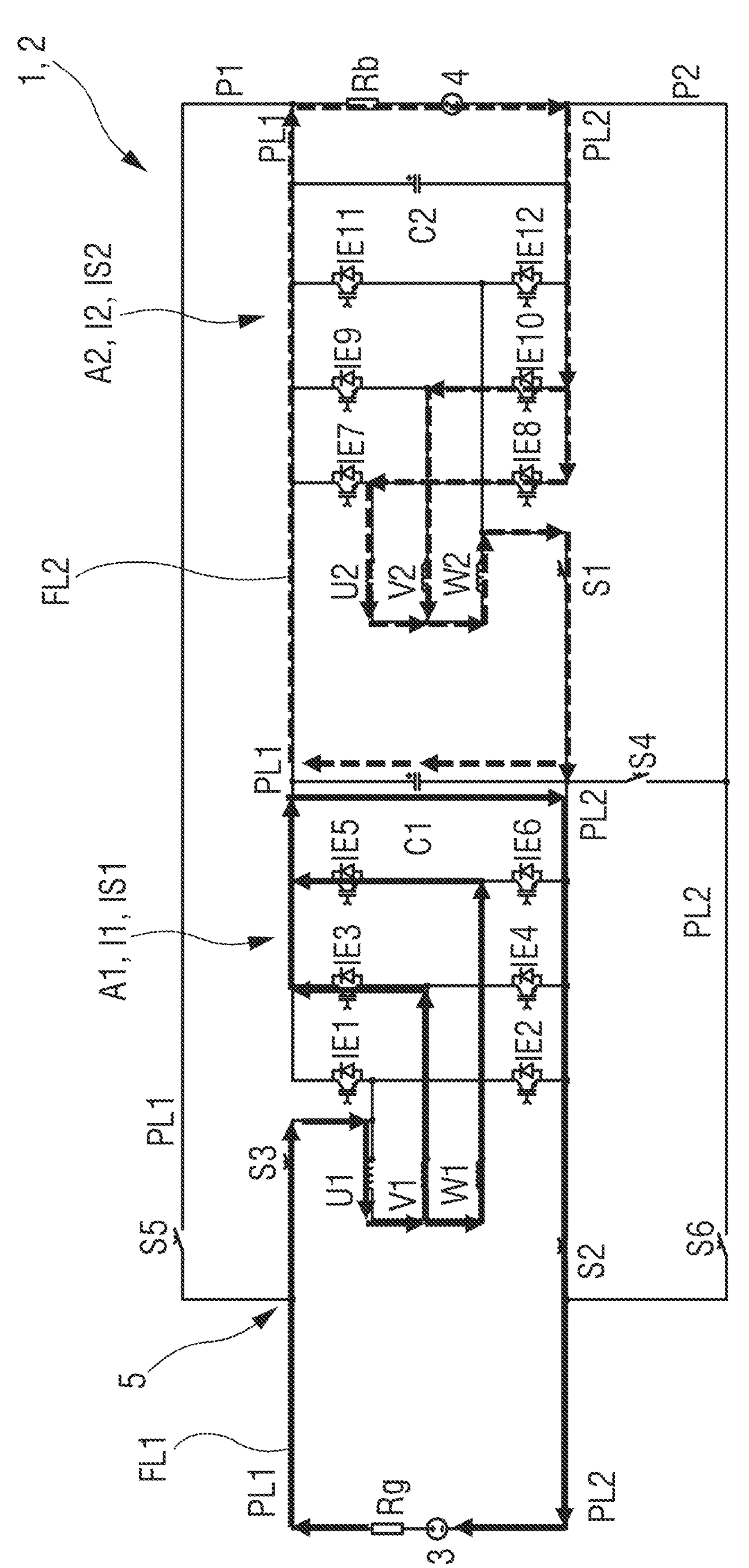
Figure 9:
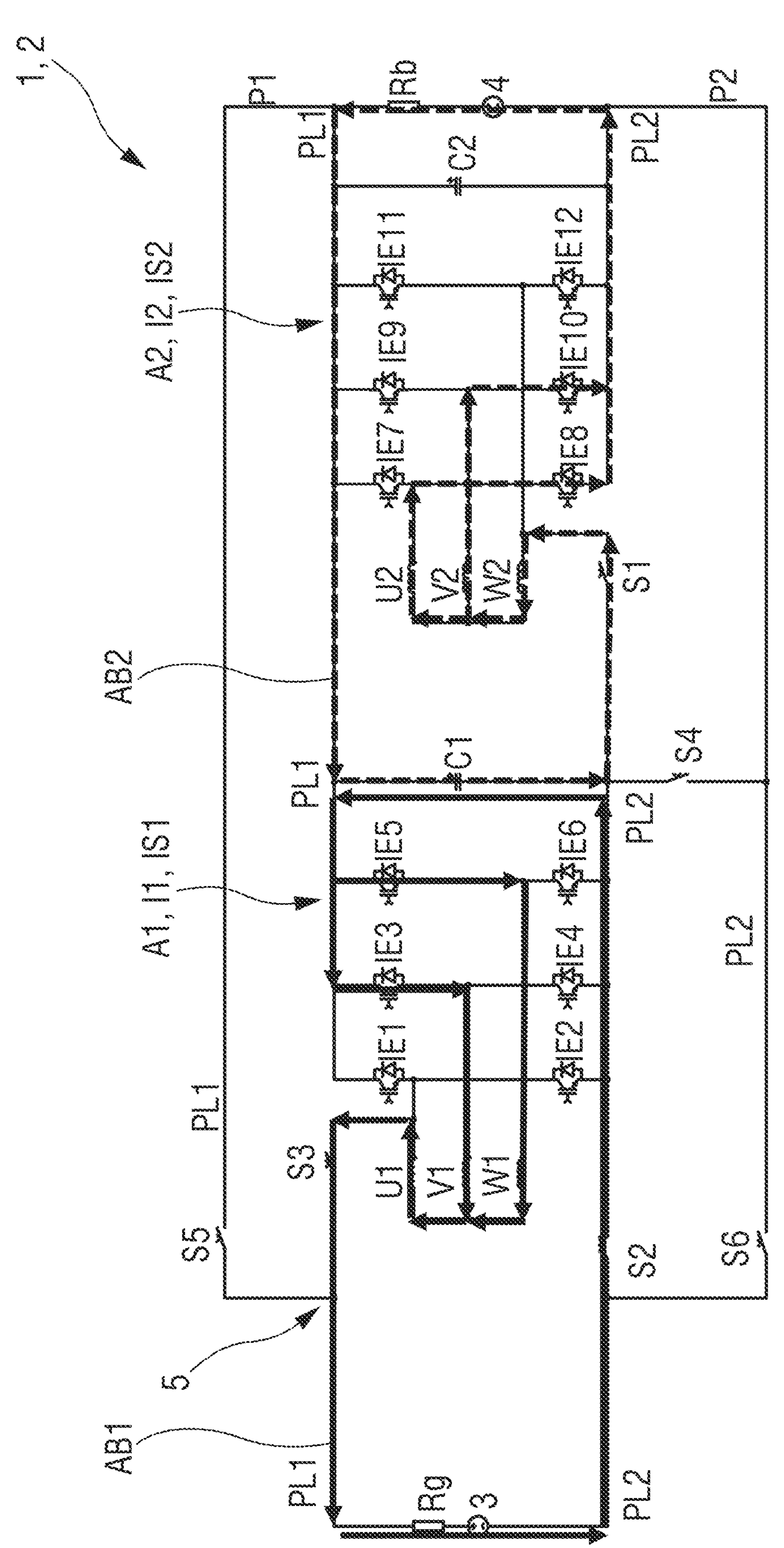
Figure 10:
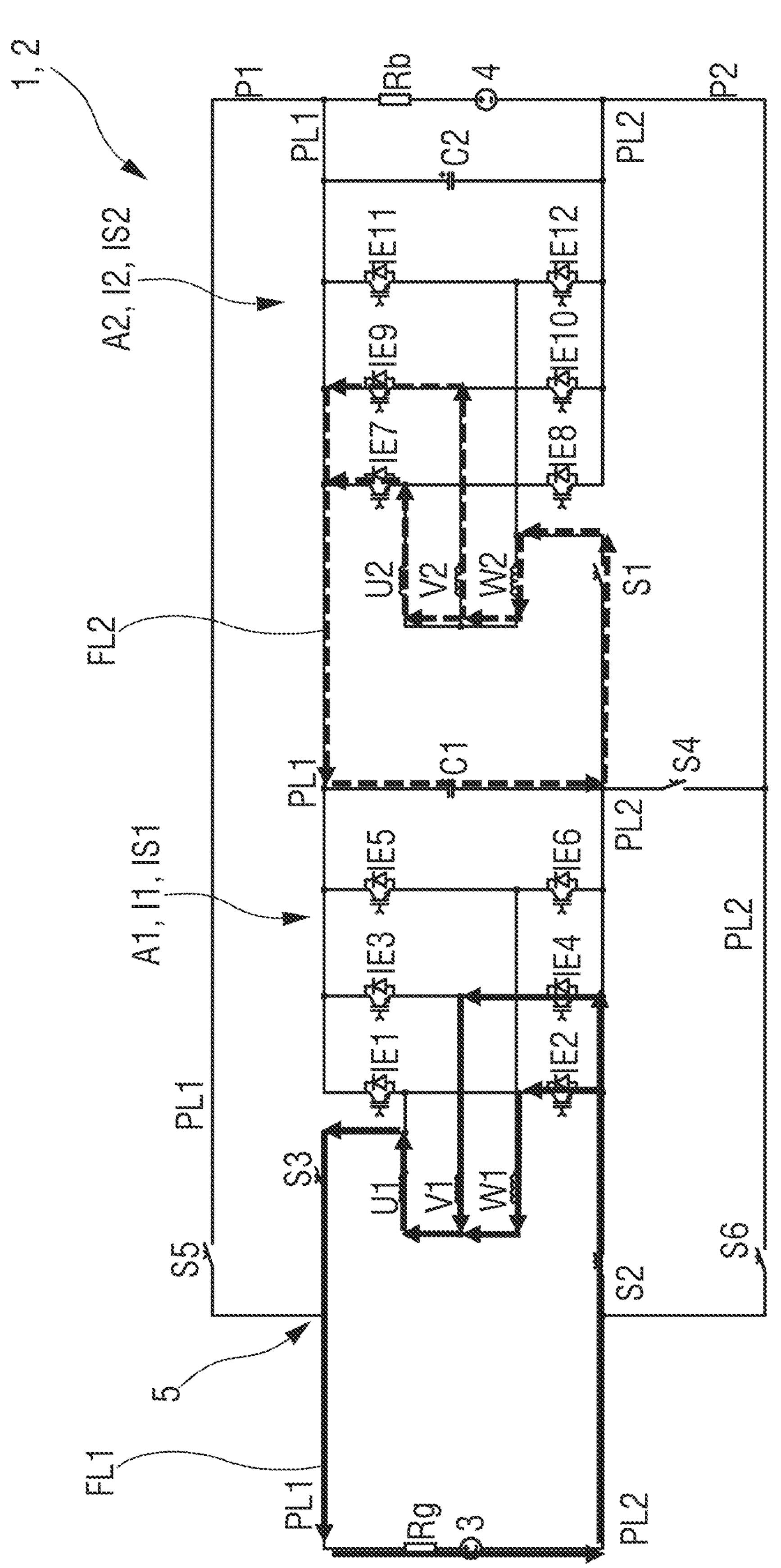
Figure 14:
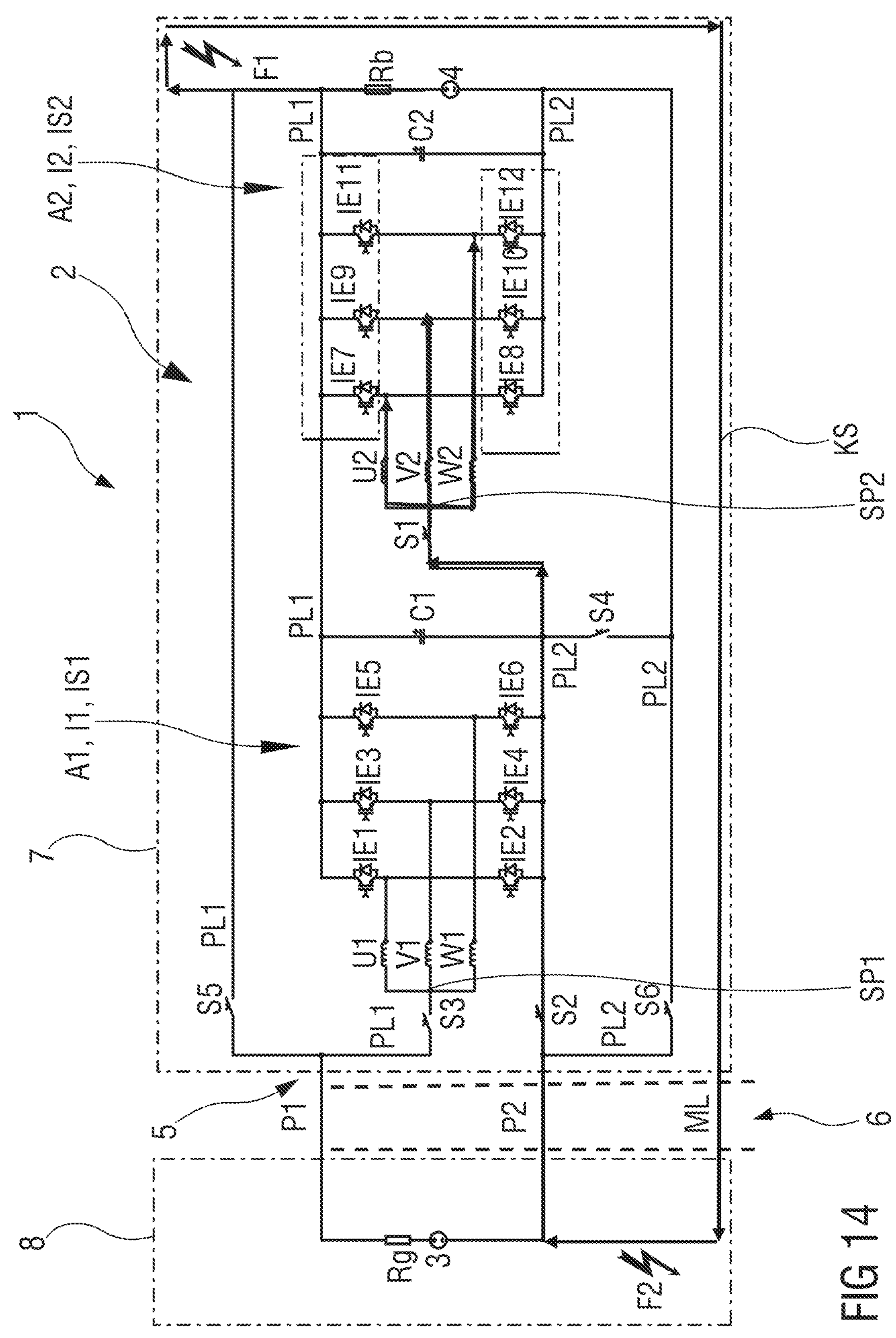
Figure 15:
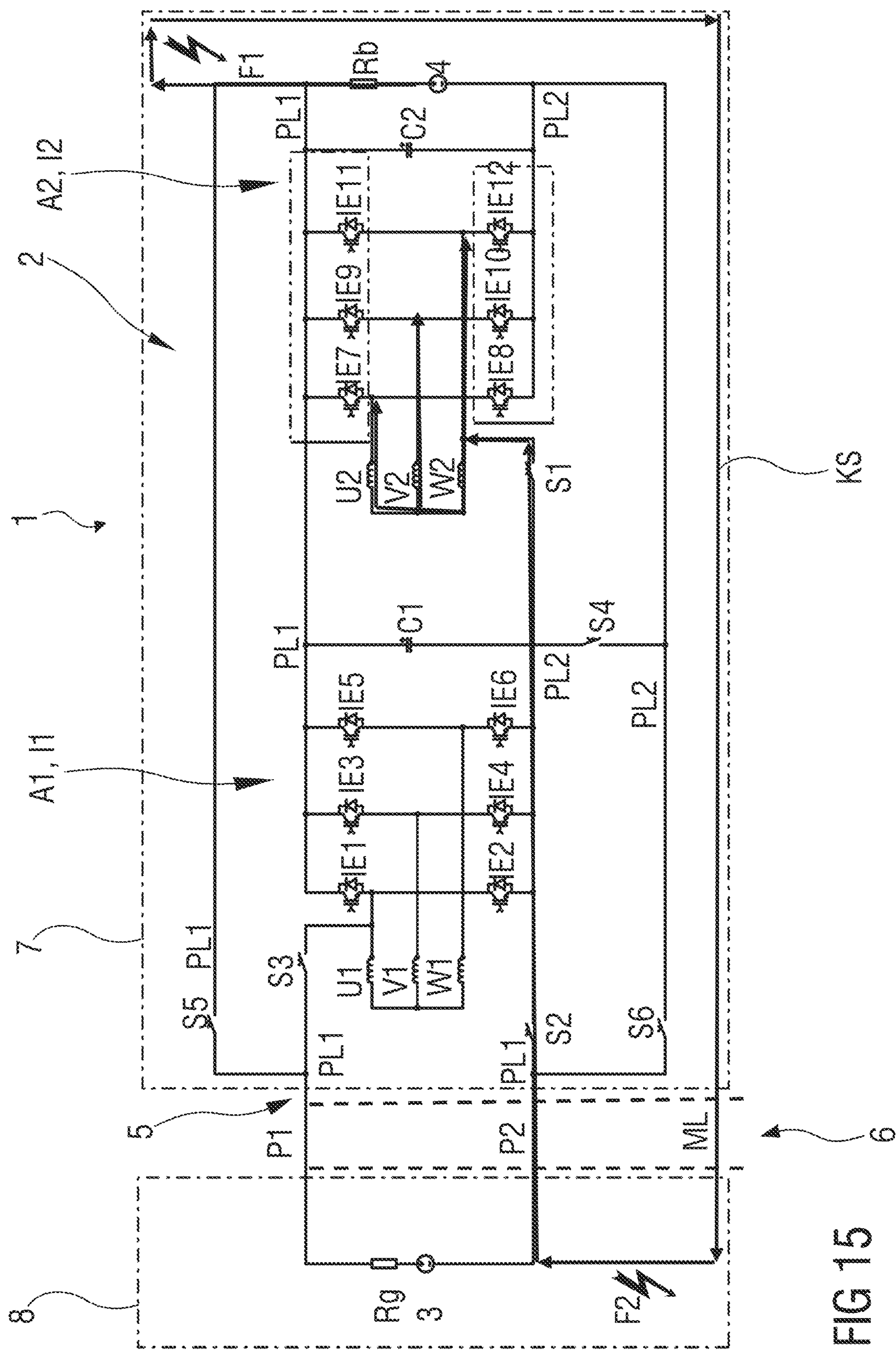

Here are shown:

FIG. 1 schematically, an embodiment of a vehicle having a switching device,

FIG. 2 schematically, a build-up of current in the switching device according to FIG. 1 in charging operation, FIG. 3 schematically, a freewheeling of the current in the switching device according to FIG. 1 in a charging operation, FIG. 4 schematically, a build-up of current in the switching device according to FIG. 1 in a buck operation, FIG. 5 schematically, a freewheeling of the current in the switching device according to FIG. 1 in a buck operation, FIG. 6 schematically, a further embodiment of a vehicle having a switching device, FIG. 7 schematically, a build-up of current in the switching device according to FIG. 6 in a charging operation, FIG. 8 schematically, a freewheeling of the current in the switching device according to FIG. 6 in a charging operation, FIG. 9 schematically, a build-up of current in the switching device according to FIG. 6 in a buck operation, FIG. 10 schematically, a freewheeling of the current in the switching device according to FIG. 6 in a buck operation, FIG. 11 schematically, an example of DC conversion by means of the switching device, FIG. 12 schematically, a further example of DC conversion by means of the switching device, FIG. 13 schematically, a further example of DC conversion by means of the switching device, FIG. 14 schematically, the embodiment according to FIG. 1 in the event of a short circuit in the vehicle, and FIG. 15 schematically, the embodiment according to FIG. 6 in the event of a short circuit in the vehicle.

Parts corresponding to one another are provided with the same reference numerals in all figures.

DETAILED DESCRIPTION

By way of example, FIGS. 1 and 6 show two embodiments of a vehicle 1 having an electrical circuit arrangement 2. In both embodiments depicted, the vehicle 1 is electrically coupled to a vehicle-external electric unit 3 formed as a DC charging station. An internal resistance Rg of the DC charging station is also depicted here in each case.

The circuit arrangement 2 comprises a traction battery 4, wherein an internal resistance Rb of the traction battery 4 is also depicted here, and furthermore an electrical connection 5 for electrical coupling with the vehicle-external electric unit 3, a first high-voltage potential P1 and a second high-voltage potential P2. In the embodiments depicted, the first high-voltage potential P1 is a positive high-voltage potential and the second high-voltage potential P2 is a negative high-voltage potential. In other embodiments, this can also be the other way round.

The circuit arrangement 2 further comprises two electric drive units A1, A2, each with an inverter I1, I2 and an electric three-phase motor M1, M2 electrically coupled thereto for driving the vehicle 1.

In both embodiments, the circuit arrangement 2 is designed such that both electric drive units A1, A2 can be electrically connected in series between the electrical connection 5 and the traction battery 4 such that the first electric drive unit A1 increases the first high-voltage potential P1 and the second electric drive unit A2 increases the second high-voltage potential P2 from the electrical connection 5 to the traction battery 4 or reduces it in the opposite direction. With this solution, the drive units A1, A2 interconnected in this way form a DC converter enabling so-called bidirectional charging, i.e., in one direction, charging of the traction battery 4 by a vehicle-external electric unit 3, which is electrically coupled to the electrical connection 5 as a DC charging station and whose charging voltage is lower than a nominal voltage of the traction battery 4, and in the other direction, provision of electrical energy by the traction battery 4 to a vehicle-external electric unit 3 which is electrically coupled to the electrical connection 5.

The inverters I1, I2 each have an inverter circuit IS1, IS2, comprising, in particular, a plurality of inverter switching units IE1 to IE12, in particular semiconductor switching units, in particular transistors, in particular bipolar transistors with an insulated gate electrode, in particular in combination with a diode, in particular formed as a freewheeling body diode, as depicted here. The inverter circuit IS1, IS2 is arranged in particular between a potential line PL1 of the first high-voltage potential P1 and a potential line PL2 of the second high-voltage potential P2 of the respective inverter I1, I2. The three-phase motor M1, M2 of the respective drive unit A1, A2 has three motor windings U1, V1, W1, U2, V2, W2 in a star connection, which are coupled to the inverter I1, I2 of the drive unit A1, A2 in the manner depicted.

Furthermore, the inverters I1, I2 each have a capacitor C1, C2 between their two potential lines PL1, PL2. For the electrical series connection of the two drive units A1, A2 described above, the circuit arrangement 2 is designed in such a way that the second electric drive unit A2 can be electrically connected in series with the capacitor connection of the first electric drive unit A1. For this purpose, one of the potential lines, in this case the first potential line PL1, of the inverter I2 of the second electric drive unit A2 is electrically connected to a capacitor connection contact of the capacitor connection of the inverter I1 of the first electric drive unit A1, which has the same high-voltage potential, in this case the first high-voltage potential P1.

Furthermore, in the first embodiment shown in FIG. 1, the circuit arrangement 2 is designed such that a neutral point SP2 of the electric three-phase motor M2 of the second electric drive unit A2 can be electrically connected to the other capacitor connection contact of the capacitor connection of the inverter I1 of the first electric drive unit A1, in this case by closing a first switch S1, the potential line PL2 of this inverter I1 electrically connected to this capacitor connection contact can be electrically connected to a connection contact of the electrical connection 5 having the same high-voltage potential P2, in this case by closing a second switch S2, and a neutral point SP1 of the electric three-phase motor M1 of the first electric drive unit A1 can be electrically connected to the other connection contact of the electrical connection 5, in this case by closing a third switch S3.

In the other embodiment depicted in FIG. 6, it is alternatively provided that a winding connection of the electric three-phase motor M2 of the second electric drive unit A2 can be electrically connected to the other capacitor connection contact of the capacitor connection of the inverter I1 of the first electric drive unit A1, in this case by closing the first switch S1, the potential line PL2 of this inverter I1, which is electrically connected to this capacitor connection contact, can be electrically connected to the connection contact of the electrical connection 5, which has the same high-voltage potential P2, in this case by closing the second switch S2, and a winding connection of the electric three-phase motor M1 of the first electric drive unit A1 can be electrically connected to the other connection contact of the electrical connection 5, in this case by closing the third switch S3.

In addition, it is provided in both embodiments that the traction battery 4 is electrically connected to the capacitor connection of the second electric drive unit A2. This enables the traction battery 4 to be charged as described above on the one hand, and a driving operation of the vehicle 1 on the other hand. To carry out driving operation, it is also provided that the circuit arrangement 2 is designed in such a way that the traction battery 4 can be electrically connected to the capacitor connection of the first electric drive unit A1, in this case by closing a fourth switch S4, by means of which, in the examples depicted, the second potential line PL2 of the inverter I1 of the first electric drive unit A1 is connected to the second high-voltage potential P2 of the traction battery 4.

The circuit arrangement 2 also enables the traction battery 4 to be charged by a vehicle-external electric unit 3, which is electrically coupled to the electrical connection 5 as a DC charging station and whose charging voltage is at least as high as the nominal voltage of the traction battery 4. For this purpose, it is provided that the circuit arrangement 2 is designed such that the electrical connection 5 can be electrically connected directly to the traction battery 4, in both embodiments by closing a fifth and sixth switch S5, S6, whereby the high-voltage potentials P1, P2 of the traction battery 4 and the vehicle-external electric unit 3 are directly connected to one another by corresponding continuous potential lines PL1, PL2.

The switches S1 to S6 are each designed as contactors, for example.

In the two embodiments according to FIGS. 1 and 6, EMC output filters (EMC=electromagnetic compatibility) not depicted here can also be provided by the vehicle 1 to the DC charging station.

For charging the traction battery 4 by a vehicle-external electric unit 3, electrically coupled to the electrical connection 5 as a DC charging station and whose charging voltage is lower than the nominal voltage of the traction battery 4, and/or for providing electrical energy from the traction battery 4 to a vehicle-external electric unit 3, which is electrically coupled to the electrical connection 5, the two electric drive units A1, A2 are electrically connected in series between the electrical connection 5 and the traction battery 4. For this purpose, the switches S1, S2 and S3 are closed and the switches S4, S5 and S6 are opened in the embodiments according to FIGS. 1 and 6.

For charging the traction battery 4 by a vehicle-external electric unit 3, electrically coupled to the electrical connection 5 as a DC charging station and whose charging voltage is at least as high as the nominal voltage of the traction battery 4, the electrical connection 5 is electrically connected directly to the traction battery 4. For this purpose, switches S5 and S6 are closed in the embodiments according to FIGS. 1 and 6. The switching position of the other switches S1 to S4 is irrelevant here, i.e. they can each be open or closed.

Both inverters I1, I2 are each connected directly to the traction battery 4 for the driving mode of the vehicle 1. For this purpose, in the embodiments depicted in FIGS. 1 and 6, the switch S4 is closed and the other switches S1, S2, S3, S5, S6 are opened.

FIGS. 2 and 7 show a build-up AB1 of the current in the motor windings U1, V1, W1 of the first electric drive unit A1 by means of solid arrows and a build-up AB2 of the current in the motor windings U2, V2, W2 of the second electric drive unit A2 by means of dashed arrows for the respective embodiment according to FIG. 1 or FIG. 6 for charging the traction battery 4 by a vehicle-external electric unit 3, which is electrically coupled to the electrical connection 5 as a DC charging station and whose charging voltage is lower than the nominal voltage of the traction battery 4.

FIGS. 3 and 8 show a freewheeling FL1 of the current in the motor windings U1, V1, W1 of the first electric drive unit A1 by means of solid arrows and a freewheeling FL2 of the current in the motor windings U2, V2, W2 of the second electric drive unit A2 by means of dashed arrows for the respective embodiment according to FIG. 1 or FIG. 6 for charging the traction battery 4 by a vehicle-external electric unit 3, which is electrically coupled to the electrical connection 5 as a DC charging station and whose charging voltage is lower than the nominal voltage of the traction battery 4.

FIGS. 4 and 9 show the structure AB1 of the current in the motor windings U1, V1, W1 of the first electric drive unit A1 by means of solid arrows and the structure AB2 of the current in the motor windings U2, V2, W2 of the second electric drive unit A2 by means of dashed arrows for the respective embodiment according to FIG. 1 or FIG. 6 for providing energy from the traction battery 4 to a vehicle-external electric unit 3, which is electrically coupled to the electrical connection 5.

FIGS. 5 and 10 show the freewheeling FL1 of the current in the motor windings U1, V1, W1 of the first electric drive unit A1 by means of solid arrows and the freewheeling FL2 of the current in the motor windings U2, V2, W2 of the second electric drive unit A2 by means of dashed arrows for the respective embodiment according to FIG. 1 or FIG. 6 for providing energy from the traction battery 4 to a vehicle-external electric unit 3, which is electrically coupled to the electrical connection 5.

The solution described also avoids the disadvantages of a galvanically coupled DC converter, as this causes a potential shift in only one high-voltage potential P1, P2, while the other high-voltage potential P2, P1 is connected through from the DC charging station to the vehicle 1. This can lead to an overload of the insulation during the charging process. This can be triggered by an asymmetrical insulation resistance distribution in the DC charging station and/or in the vehicle 1. In addition, an insulation monitor also leads to a potential shift, which can lead to an insulation overload in the DC charging station.

In contrast, in the solution described here, the potential shift of both potentials P1, P2 can be controlled, as shown by way of example in FIGS. 11 to 13. In each case, charging of the traction battery 4 with a nominal voltage of 800V at a DC charging station with a charging voltage of 400V is shown here. The two potentials P1, P2 from the DC charging station on the left to the traction battery 4 on the right and a reference potential M, in particular ground potential, with 0V are depicted in each case.

In the example according to FIG. 11, the potential distribution in vehicle 1 does not lead to an overload of the insulation at the weaker insulated DC charging station. The drive units A1, A2 are therefore free to choose the transmission ratio.

In the example according to FIG. 12, the potential distribution in the vehicle 1 would lead to an overload of the insulation at the weaker insulated DC charging station in the first high-voltage potential P1. Therefore, the second drive unit A2 increases the second high-voltage potential P2 with a lower transformation ratio or is passively connected through, as depicted here. The first drive unit A1 increases the first high-voltage potential P1 at a higher transformation ratio.

In the example according to FIG. 13, the potential distribution in the vehicle 1 would lead to an overload of the insulation at the weaker insulated DC charging station in the second high-voltage potential P2. Therefore, the first drive unit A1 increases the first high-voltage potential P1 with a lower transformation ratio or is passively connected through, as depicted here. The second drive unit A2 increases the second high-voltage potential P2 with a higher transformation ratio.

The reaction of the circuit arrangement 2, in particular of the two drive units A1, A2 electrically connected in series in the manner described above, to an asymmetrical potential distribution can be carried out, for example, as described in DE 10 2017 009 352 A1, in particular by controlling and/or regulating the inverters I1, I2, in particular their inverter circuits IS1, IS2.

Compliance with the insulation strength in the charging point is ensured for the charging operation described above, in particular in the event of a potential shift caused by insulation monitors, as well as in the event of asymmetrical insulation resistances and/or slowly occurring insulation faults.

Compatibility with the insulation monitor is ensured, for example, according to the procedure described in the following publication: PCIM 2021, Quasi-Isolated HV/HV-DC/DC-Converter for Electric Driven Vehicles with Multiple High-Voltage Levels, André Haspel, Urs Böhme, Mercedes-Benz AG, Germany.

A further disadvantage of a galvanically coupled DC converter avoided by the disclosed solution is that in the event of an insulation fault in the vehicle 1, the galvanically coupled DC converter can cause a further insulation fault in the opposing high-voltage potential P2, P1 on the DC charging station side as a direct consequence. This creates a short circuit in the traction battery 4, which in the so-called CHAdeMO charging standard will lead to the destruction of a ground potential line ML in a charging cable 6, by means of which the electrical connection 5 of the vehicle 1 is electrically coupled to the DC charging station, because this ground potential line ML in the charging cable 6 is only very thin.

FIG. 14 shows the solution to this problem with the embodiment according to FIG. 1 and FIG. 15 with the embodiment according to FIG. 6. In each case, the vehicle 1, here in particular a chassis 7 of the vehicle 1, is depicted with the circuit arrangement 2 and the vehicle-external unit 3 designed as a DC charging station, here in particular having a metal housing 8. The DC charging station has a design voltage and/or charging voltage of 500V, for example. The traction battery 4 has a nominal voltage of 800V, for example.

An insulation fault F1 occurs in the vehicle 1. An insulation fault F2 also occurs here as direct consequence and a resulting overload of the insulation in the DC charging station due to the applied voltage of 800V of the traction battery 4. The resulting battery short-circuit current KS is shown by means of arrows.

A critical operating state is shown here during buck operation, i.e., during the feeding-in of electrical energy from the traction battery 4 to the vehicle-external electric unit 3 designed as a DC charging station, for example for feeding into the public power supply network. The insulation fault F1 in the vehicle 1 is present from the first high-voltage potential P1 to the reference potential M, in particular ground potential, i.e., in particular to the chassis 7 of the vehicle 1. The increase in short-circuit current is then slowed down by the motor windings U2, V2 and W2 of the second drive unit A2, such that a monitoring system, for example by means of current measurement and/or voltage measurement, has sufficient time to recognize the fault without an overload/destruction of the ground potential line ML in the charging cable 6, the DC charging station or parts of the vehicle 1 having occurred. Buck operation can be stopped by opening the inverter switching units IE8, IE10, IE12, which are designed in particular as semiconductor switching units. The impressed current in the motor windings U2, V2 and W2 is continued via the freewheeling body diodes of the inverter switching units IE7, IE9, IE11, and the energy of the inductors, including the inductor of the supply line, is recharged in the capacitor C1. The short-circuit current is then completely reduced to 0 A.

An insulation fault from the second high-voltage potential P2 HV—to the reference potential M, in particular ground potential, in the vehicle 1 would accordingly lead to an overload of the first high-voltage potential P1 to the reference potential M, in particular ground potential, in the DC charging station. This current can also be interrupted according to the same principle, wherein the corresponding components of the first drive unit A1 are then affected.

It is therefore possible to react to a short circuit occurring due to an insulation fault F1 in the vehicle 1 by slowing down the rise in current through the motor inductors. This provides sufficient time for the fault to be clearly recognized and for the current flow to be interrupted. The impressed current in the motor inductors can be recharged to a capacitance via freewheeling/body diodes.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 1 vehicle
2 circuit arrangement
3 vehicle-external electric unit
4 traction battery
5 connection
6 charging cable
7 chassis
8 metal housing
A1, A2 drive unit
AB1, AB2 current build-up
C1, C2 capacitor
F1, F2 insulation fault
FL1, FL2 current freewheeling
I1, I2 inverter
IE1 bis IE12 inverter switching unit
IS1, IS2 inverter circuit
KS battery short-circuit current
M reference potential
M1, M2 three-phase motor
ML ground potential line
P1, P2 high-voltage potential
PL1, PL2 potential line
Rb internal resistance traction battery
Rg internal resistance DC charging station
S1 bis S6 switch
SP1, SP2 neutral point
U1, V1, W1 motor winding
U2, V2, W2 motor winding

The invention claimed is:

1. A vehicle comprising:

an electrical circuit arrangement, which comprises a traction battery;

an electrical connection configured to be electrically coupled to a vehicle-external electric unit;

a first high-voltage potential;

a second high-voltage potential, wherein the first high-voltage potential is a positive high-voltage potential and the second high-voltage potential is a negative high-voltage potential or vice-versa; and first and second electric drive units, each having an inverter and an electric three-phase motor electrically coupled to a respective one of the first and second electric drive units, wherein the first and second electric drive units are configured to drive the vehicle, wherein the electrical circuit arrangement is configured such that the first and second electric drive units are selectively connected in series between the electrical connection and the traction battery such that, from the electrical connection to the traction battery, the first electric drive unit increases the first high-voltage potential and the second electric drive unit increases the second high-voltage potential, wherein the inverters each have a capacitor between a potential line of the first high-voltage potential and a potential line of the second high-voltage potential, wherein the electrical circuit arrangement is configured such that the second electric drive unit is selectively connected in series with a capacitor connection of the first electric drive unit, wherein one of the potential lines of the inverter of the second electric drive unit is electrically connected to a capacitor connection contact, having a same high-voltage potential, of the capacitor connection of the inverter of the first electric drive unit, and wherein the electrical circuit arrangement is configured such that a neutral point of the electric three-phase motor of the second electric drive unit is selectively connected to the other capacitor connection contact of the capacitor connection of the inverter of the first electric drive unit, the potential line of the first electric drive unit is selectively connected to a connection contact of the electrical connection, which has the same high-voltage potential, and a neutral point of the electric three-phase motor of the first electric drive unit is selectively connected to another connection contact of the electrical connection, or a winding connection of the electric three-phase motor of the second electric drive unit is selectively connected to the other capacitor connection contact of the capacitor connection of the inverter of the first electric drive unit, the potential line of the first electric drive unit is selectively connected to the connection contact of the electrical connection having the same high-voltage potential, and a winding connection of the electric three-phase motor of the first electric drive unit is selectively connected to the other connection contact of the electrical connection.

2. The vehicle of claim 1, wherein the traction battery is electrically connected to the capacitor connection of the second electric drive unit.

3. The vehicle of claim 1, wherein the electrical circuit arrangement is configured in such a way that the traction battery is selectively connected to the capacitor connection of the first electric drive unit.

4. The vehicle of claim 1, wherein the electrical circuit arrangement is configured in such a way that the electrical connection is selectively connected directly to the traction battery.

5. A method for operating a vehicle comprising an electrical circuit arrangement, which comprises a traction battery; an electrical connection configured to be electrically coupled to a vehicle-external electric unit; a first high-voltage potential; a second high-voltage potential, wherein the first high-voltage potential is a positive high-voltage potential and the second high-voltage potential is a negative high-voltage potential or vice-versa; and first and second electric drive units, each having an inverter and an electric three-phase motor electrically coupled to a respective one of the first and second electric drive units, wherein the first and second electric drive units are configured to drive the vehicle, wherein the electrical circuit arrangement is configured such that the first and second electric drive units are selectively connected in series between the electrical connection and the traction battery such that, from the electrical connection to the traction battery, the first electric drive unit increases the first high-voltage potential and the second electric drive unit increases the second high-voltage potential, wherein the inverters each have a capacitor between a potential line of the first high-voltage potential and a potential line of the second high-voltage potential, wherein the electrical circuit arrangement is configured such that the second electric drive unit is selectively connected in series with a capacitor connection of the first electric drive unit, wherein one of the potential lines of the inverter of the second electric drive unit is electrically connected to a capacitor connection contact, having a same high-voltage potential, of the capacitor connection of the inverter of the first electric drive unit, and wherein the electrical circuit arrangement is configured such that a neutral point of the electric three-phase motor of the second electric drive unit is selectively connected to the other capacitor connection contact of the capacitor connection of the inverter of the first electric drive unit, the potential line of the first electric drive unit is selectively connected to a connection contact of the electrical connection, which has the same high-voltage potential, and a neutral point of the electric three-phase motor of the first electric drive unit is selectively connected to another connection contact of the electrical connection, or a winding connection of the electric three-phase motor of the second electric drive unit is selectively connected to the other capacitor connection contact of the capacitor connection of the inverter of the first electric drive unit, the potential line of the first electric drive unit is selectively connected to the connection contact of the electrical connection having the same high-voltage potential, and a winding connection of the electric three-phase motor of the first electric drive unit is selectively connected to the other connection contact of the electrical connection, the method comprising:

during a driving operation of the vehicle, both inverters are each connected directly to the traction battery, wherein the method further comprises to charge the traction battery with the vehicle-external electric unit electrically coupled to the electrical connection and is a DC charging station having a charging voltage lower than a nominal voltage of the traction battery, or for providing electrical energy by the traction battery to the vehicle-external electric unit electrically coupled to the electrical connection, the first and second electric drive units are electrically connected in series between the electrical connection and the traction battery, or to charge the traction battery with the vehicle-external electric unit electrically coupled to the electrical connection and is a DC charging station having a charging voltage is at least as high as the nominal voltage of the traction battery, the electrical connection is electrically connected directly to the traction battery.

* * * * *